United States Patent
Akama

(10) Patent No.: US 9,533,891 B2
(45) Date of Patent: Jan. 3, 2017

(54) WASHING METHOD OF GOETHITE-CONTAINING RED MUD

(71) Applicant: SHOWA DENKO K.K., Minato-ku, Tokyo (JP)

(72) Inventor: Yu Akama, Kanagawa (JP)

(73) Assignee: SHOWA DENKO K.K., Tokyo (JP)

(*) Notice: Subject to any disclaimer, the term of this patent is extended or adjusted under 35 U.S.C. 154(b) by 447 days.

(21) Appl. No.: 14/113,421

(22) PCT Filed: Apr. 5, 2013

(86) PCT No.: PCT/JP2013/060551
§ 371 (c)(1),
(2) Date: Oct. 23, 2013

(87) PCT Pub. No.: WO2013/161546
PCT Pub. Date: Oct. 31, 2013

(65) Prior Publication Data
US 2014/0091042 A1    Apr. 3, 2014

(30) Foreign Application Priority Data

Apr. 26, 2012    (JP) ................. 2012-101609

(51) Int. Cl.
*C01F 7/00*    (2006.01)
*C01F 7/04*    (2006.01)
(Continued)

(52) U.S. Cl.
CPC ............. *C01F 7/0653* (2013.01); *B01D 21/01* (2013.01); *B03D 3/06* (2013.01); *C01F 7/066* (2013.01);
(Continued)

(58) Field of Classification Search
None
See application file for complete search history.

(56) References Cited

U.S. PATENT DOCUMENTS 3,390,959 A    7/1968    Sibert
3,445,187 A    5/1969    Sibert
(Continued)

FOREIGN PATENT DOCUMENTS

CA    1018361 A    10/1977
CA    1176031 A  * 10/1984  ............ C01F 7/0653
(Continued)

OTHER PUBLICATIONS

Li et al. ("A study of iron mineral transformation to reduce red mud tailings", Waste Management, 2001, 21, 525-534).*
(Continued)

*Primary Examiner* — Nam Nguyen
*Assistant Examiner* — Clare Perrin
(74) *Attorney, Agent, or Firm* — Sughrue Mion, PLLC

(57) ABSTRACT

A washing method of red mud that is produced when an alumina-containing ore having a goethite to hematite mass ratio of 60/40 (goethite/hematite) or more in the iron component thereof is heat-treated with an alkaline solution at a temperature of 110° C. to 160° C. to obtain an aluminate liquor, including: mixing the red mud with a diluting fluid to obtain suspension that has an aluminum concentration of 95 g/L or less in terms of $Al_2O_3$; adding a flocculant to the suspension, wherein the flocculant includes a polymer having a repeating unit derived from (meth)acrylic acid or a salt thereof and being substantially free from a repeating unit derived from vinylhydroxamic acid compound or a salt thereof; and settling and separating the red mud so as to wash the red mud.

4 Claims, 3 Drawing Sheets

(51) Int. Cl.
  *C01F 7/02* (2006.01)
  *C02F 1/52* (2006.01)
  B01D 21/01 (2006.01)
  *C01F 7/06* (2006.01)
  *C22B 21/00* (2006.01)
  *B03D 3/06* (2006.01)
  *C02F 1/56* (2006.01)
  *B01D 21/00* (2006.01)
  *B03D 3/00* (2006.01)
  *C02F 1/00* (2006.01)
  *C22B 3/12* (2006.01)
  *C22B 3/00* (2006.01)
  *C02F 103/10* (2006.01)

(52) U.S. Cl.
  CPC ............... *C02F 1/56* (2013.01); *C22B 21/00* (2013.01); *C01F 7/06* (2013.01); *C02F 2103/10* (2013.01); *C22B 3/00* (2013.01); *C22B 3/12* (2013.01)

(56) References Cited

U.S. PATENT DOCUMENTS

| | | | |
|---|---|---|---|
| 4,036,931 | A | 7/1977 | Roberson et al. |
| 5,008,089 | A | 4/1991 | Moody et al. |
| 6,036,869 | A * | 3/2000 | Selvarajan ............ B01D 21/01 210/733 |
| 2002/0096476 | A1 | 7/2002 | Ishikawa et al. |

FOREIGN PATENT DOCUMENTS

| | | |
|---|---|---|
| EP | 0618882 B1 | 11/1996 |
| GB | 2112366 A | 7/1983 |
| JP | 50-159497 A | 12/1975 |
| JP | 54-003838 A | 1/1979 |
| JP | 56-92116 A | 7/1981 |
| JP | 56-092116 A | 7/1981 |
| JP | 57-51117 A | 3/1982 |
| JP | 57-051117 A | 3/1982 |
| JP | 57-78911 A | 5/1982 |
| JP | 58-042131 A | 3/1983 |
| JP | 2002-137919 A | 5/2002 |
| JP | 2003-54942 A | 2/2003 |
| WO | 2013/61546 A1 | 10/2013 |

OTHER PUBLICATIONS

International Search Report dated Jun. 4, 2013 for PCT/JP2013/060551.
Everett C. Phillips et al.; "Development of New Polyacrylate Flocculants for Red Med Clarification"; Light Metals 2006; TMS (The Minerals, Metals & Materials Society); pp. 5-9.
Koichi Yamada, et al.; "Flocculation and sedimentation of red mud" Journal of Japan Institute of Light Metals; vol. 31, No. 1; Jan. 30, 1981; pp. 37-42.
Notice of Opposition dated Aug. 14, 2015 from the Australian Intellectual Property Office in counterpart application No. 2013231168.
Statement of Grounds and Particulars dated Nov. 13, 2015 to the Australian Intellectual Property Office in counterpart application No. 2013231168.
Li et al., "Effect of bauxite properties on the settling of red mud," Elsevier Science B.V., Int. J. Miner. Process 48 (1996) 169-182.

* cited by examiner

WASHING METHOD OF GOETHITE-CONTAINING RED MUD

CROSS REFERENCE TO RELATED APPLICATIONS

This application is a National Stage of International Application No. PCT/JP2013/060551 filed Apr. 5, 2013, claiming priority based on Japanese Patent Application No. 2012-101609 filed Apr. 26, 2012, the contents of all of which are incorporated herein by reference in their entirety.

TECHNICAL FIELD

The present invention relates to a washing method of red mud, wherein the red mud is produced by heat-treating with an alkaline solution an alumina-containing ore having a goethite to hematite mass ratio of 60/40 (goethite/hematite) or more in an iron component thereof, includes settling and separating the red mud from suspension.

BACKGROUND ART

As a method of extracting alumina from an alumina-containing ore, the Bayer process is generally adopted. In the Bayer process, generally as the alumina-containing ore, bauxite, which is so called because of the geographical name of the origin thereof, after wet-grinding, is mixed with an alkaline solution to obtain slurry; the slurry is treated at high temperature so as to extract an alumina component that is contained in bauxite; after that, bauxite residue (extraction residue: usually called as "red mud" because of its red color provided from an iron component and humin contained therein) that is an undissolved component is subjected to solid-liquid separation. Aluminum hydroxide is precipitated out of an alumina-extracted liquid (aluminate liquor) from which red mud has been removed. Then, the aluminum hydroxide is calcinated so as to obtain alumina.

Separation of the residue (red mud) that is the undissolved component of bauxite is performed by cooling, at around 100° C. under atmospheric pressure, the extracted slurry that has been heat-treated at high temperature. As a separation apparatus, usually a thickener equipped with a mud collector is adopted. The solid-liquid separation requires long time because the particle size of the residue is extremely small as 10 μm or less. Therefore, in order to promote settling of the bauxite residue, conventionally a water-soluble polymer flocculant is used. In Patent Document 1, as the polymer flocculant, sodium acrylate, a copolymer of sodium acrylate and amide acrylate, or the like is used. In this document, in order to improve settling rate of the residue and to enhance the level of concentration to solid of the lower liquid of the thickener and the clarification of the upper liquid, a flocculant including starch and slaked lime is also used. Patent Document 1 further describes that alumina-containing ores produced from Australia and Jamaica are used, wherein the polymer flocculant used in the initial process of an alumina recovery circuit is different from the polymer flocculant used in the following process.

However, these polymer flocculants are not always effective for the separation of extraction residues obtained from all of the alumina-containing ores. For example, it is known that these are effective for promoting settling of the red mud obtained from bauxite produced from GOVE ore in Australia, but these are not effective for the red mud obtained from bauxite produced in Southeast Asia, particularly in Indonesia. This is because, while bauxite residue contains mainly such components as iron, silica, aluminum, titanium, and sodium, these components have different crystal morphologies depending on the kinds of bauxite, whereby settling rate, level of concentration to solid, clarification, and others are affected. Examples of compositions that exhibit an adequate settling rate include hematite ($Fe_2O_3$), anatase ($TiO_2$), and boehmite (γ-AlOOH). On the other hand, examples of compositions that exhibit poor settling rate include goethite (FeO(OH)), sodalite ($Na_4ClSi_3Al_3O_{12}$), rutile ($TiO_2$), and gibbsite ($Al(OH)_3$) (Non-Patent Document 1).

Alumina-containing ores represented by BINTAN ore and TAYAN ore of Indonesia are imported in a large amount to Japan. These ores contain a trihydrate (gibbsite) as an alumina component and FeO(OH) (goethite) or (Fe,Al)O(OH) (goethite aluminum) as an iron component. When such ores are treated by conventional Bayer process, because goethite that has a slow settling rate is contained in the extraction residue (red mud), settling separation with a conventional flocculant is difficult. In view of the above circumstances, there have been various kinds of proposals to improve settling property of such bauxite extraction residues that have a high content of goethite.

Patent Document 2 describes a process of converting goethite that is contained in bauxite into magnetite ($Fe_3O_4$) by rising alumina extraction temperature. In this process, alumina extraction is performed in the presence of a reducing organic substance and at an extraction temperature of 270° C. or higher so as to convert goethite into magnetite that has an adequate settling property, whereby settling is improved. This process has a problem of being not economically advantageous in view of energy consumption or requiring expensive materials for apparatuses.

Patent Document 3 and Patent Document 4 describe a process of combining substances that have an adequate settling property. In the process, a substance that contains a composition having an adequate settling property is added and mixed, so that the composition ratio in the residue is changed and that substances having poor settling property are separated adequately. However, in the process, the composition having an adequate settling property is required to be ready for use at any time, whereby the process becomes complicated and is not economically advantageous.

Furthermore, Patent Document 5 describes a proposal of using starch that is cationized into a quaternary ammonium type as a flocculant. Settling property is somewhat improved by using the flocculant for the separation of red mud obtained from an alumina-containing ore that involves goethite therein, however, it is considered not to be sufficient for an industrial treatment.

As described above, in the red mud separation treatment for alumina-containing ores that are imported into Japan in a large amount, particularly the ores that are produced in Indonesia and involve goethite therein, a flocculant that has both adequate settling separation performance and economical advantages and exhibits sufficient practical performance by itself has not been known so far.

In view of the above circumstances, Patent Document 6 describes a proposal of using a water-soluble polymer flocculant that contains, as an effective ingredient, a copolymer having a repeating unit derived from a vinylhydroxamic acid compound in the separation treatment of red mud obtained from alumina-containing ores that involve goethite therein.

PRIOR ART DOCUMENTS

Patent Documents

Patent Document 1: Japanese Patent Laid-Open Publication No. 57-51117
Patent Document 2: Japanese Patent Laid-Open Publication No. 50-159497

Patent Document 3: Japanese Examined Patent Application Publication No. 54-3838
Patent Document 4: Japanese Examined Patent Application Publication No. 58-42131
Patent Document 5: Japanese Patent Laid-Open Publication No. 56-92116
Patent Document 6: Japanese Patent Laid-Open Publication No. 2002-137919

Non-Patent Documents

Non-Patent Document 1: K. Yamada et. al., Light Metals, 1980, pp 39 to pp 50

SUMMARY OF THE INVENTION

Problems to be Solved by the Invention

The flocculant composed of a polymer that contains vinylhydroxamic acid as disclosed in Patent Document 6 may be used for separation concentration of red mud obtained from an alumina-containing ore that involves goethite therein, but a problem of providing settled red mud with an insufficient concentration rate still remains. In addition, as compared with sodium polyacrylate that is conventionally used, the polymer structure is rather unusual, so that there remain problems of high price of the polymer and others.

Therefore, it is an object of the present invention to provide a washing method of red mud which can be applied to washing treatment of red mud obtained from alumina-containing ores including therein goethite as an iron component in a large amount, and can obtain a red mud with a high level of concentration to solid.

Means for Solving the Problem

As a result of intensive studies, in a washing process of red mud that has a goethite to hematite mass ratio of 60/40 (goethite/hematite) or more in the iron component thereof, such as a red mud derived from alumina-containing ores produced in Indonesia, the present inventor has found that, even in the case where a flocculant such as sodium polyacrylate and a copolymer of sodium acrylate and acrylamide is used, settling of red mud is allowed to be promoted by adding the flocculant under a condition of limiting the amount of an aluminum component contained in the suspension to a given value or lower. In addition, a high level of concentration to solid of red mud has been found to be attained. The present invention has been accomplished on the basis of the above findings.

Accordingly, the present invention relates to the following items [1] to [9].

[1] A washing method of red mud that is produced when an alumina-containing ore having a goethite to hematite mass ratio of 60/40 (goethite/hematite) or more in the iron component thereof is heat-treated with an alkaline solution at a temperature of 110° C. to 160° C. to obtain an aluminate liquor, comprising:
mixing the red mud with a diluting fluid to obtain suspension that has an aluminum concentration of 95 g/L or less in terms of $Al_2O_3$;
adding a flocculant to the suspension, wherein, the flocculant comprises a polymer having a repeating unit derived from (meth)acrylic acid or a salt thereof and being substantially free from a repeating unit derived from vinylhydroxamic acid compound or a salt thereof; and
settling and separating the red mud so as to wash the red mud.

[2] The washing method of red mud according to [1],
wherein, 70 mass % or more of the aluminum component of the alumina-containing ore is gibbsite.

[3] The washing method of red mud according to [1] or [2],
wherein, the concentration of alkali in the suspension is 200 g/L or less in terms of NaOH.

[4] The washing method of red mud according to any of [1] to [3],
wherein, the concentration of alkali in the suspension is 200 g/L or less and 30 g/L or more in terms of NaOH, and the polymer that is contained in the flocculant has an anionization degree of 70 mole % to 100 mole %.

[5] The washing method of red mud according to any of [1] to [3],
wherein, the concentration of alkali in the suspension is 35 g/L or less in terms of NaOH, and the polymer that is contained in the flocculant has an anionization degree of 40 mole % to 70 mole %.

[6] A washing method of red mud that is produced when an alumina-containing ore having a goethite to hematite mass ratio of 60/40 (goethite/hematite) or more in the iron component thereof is heat-treated with an alkaline solution at a temperature of 110° C. to 160° C. to obtain an aluminate liquor, comprising:
repeating a process which includes mixing the red mud with a diluting fluid to obtain suspension; adding a flocculant to the suspension; and settling and separating the red mud,
wherein, the process having the concentration of aluminum in the suspension of 95 g/L or less in terms of $Al_2O_3$ includes adding a flocculant comprising a polymer having a repeating unit derived from (meth)acrylic acid or a salt thereof and being substantially free from a repeating unit derived from vinylhydroxamic acid compound or a salt thereof.

[7] The washing method of red mud according to [6],
wherein the process having the concentration of aluminum in the suspension of 95 g/L or less in terms of $Al_2O_3$ and the concentration of alkali in the suspension of 200 g/L or less and 30 g/L or more in terms of NaOH includes adding the flocculant comprising a polymer having an anionization degree of 70 mole % to 100 mole % and having a repeating unit derived from (meth)acrylic acid or a salt thereof and being substantially free from a repeating unit derived from vinylhydroxamic acid compound or a salt thereof.

[8] The washing method of red mud according to [6] or [7],
wherein the process having the concentration of aluminum in the suspension of 95 g/L or less in terms of $Al_2O_3$ and the concentration of alkali in the suspension of 35 g/L or less in terms of NaOH includes adding a flocculant comprising a polymer having an anionization degree of 70 mole % to 100 mole % and having a repeating unit derived from (meth)acrylic acid or a salt thereof and being substantially free from a repeating unit derived from vinylhydroxamic acid compound or a salt thereof.

[9] A method of producing red mud by a washing method according to any of [1] to [8],
wherein, the red mud has a level of concentration to solid of 600 g/L or more.

Effect of the Invention

In the present invention, when red mud that is produced in the course of extracting aluminum from an alumina-containing ore that has a goethite to hematite mass ratio of 60/40 (goethite/hematite) or more is settled from suspension, the concentration of aluminum in the suspension is limited to a given value or less, whereby even a polymer that contains a repeating unit derived from acrylic acid or a salt thereof and is free from a vinylhydroxamic acid compound or a salt thereof is allowed to exert an effect of promoting settling of the red mud. In addition, in the settling of the red mud, a high level of concentration to solid and a high stability of mud surface are allowed to exhibit.

Conventional separation of red mud when alumina is extracted from an alumina-containing ore that contains goethite has required an unusual operation so far and is economically disadvantageous. However, in accordance with the present invention, the red mud is separable in high concentration with a simple operation rapidly.

MODE FOR CARRYING OUT THE INVENTION

Figure 1:
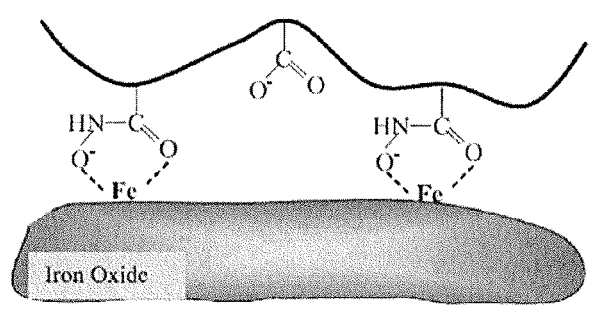
FIG. 1 shows a schematic diagram illustrating a mechanism of flocculation in which a polymer flocculant containing sodium vinyloxamate forms a five-membered ring with Fe contained in bauxite residue (flocculation morphology of vinylhydroxamic acid).

The present invention relates to a washing method of red mud that is produced by so-called Bayer process. According to the method of the present invention, the red mud produced by the Bayer process is mixed with a diluting fluid to obtain suspension, after that, a flocculant is added to the suspension so as to clean the red mud through settling and separation. Washing of the red mud is usually performed repeatedly. Considering economical aspects, the red mud is disposed after an alkali component such as sodium hydroxide and an aluminum component that are contained in the red mud slurry are recovered.

Red Mud and Bayer Process

In the washing method of the present invention, red mud is produced by the method (Bayer process) in which an alumina-containing ore that has a goethite to hematite mass ratio of 60/40 (goethite/hematite) or more in the iron component thereof is heat-treated with an alkaline solution at a temperature of 110° C. to 160° C. so as to obtain an aluminate liquor. In more detail, through heat-treatment, the red mud is produced as a water-insoluble residue.

In the present invention, the alumina-containing ore that is used in the Bayer process has a goethite to hematite mass ratio of 60/40 (goethite/hematite) or more in the iron component thereof. Note that, the above numerical range is defined by using a value measured in accordance with the method described in Examples.

In addition, the iron component may include a goethite compound. Examples of the goethite compound include a compound represented by (Fe, M)O(OH) (here, M represents aluminum, cobalt, nickel, or manganese). More specifically, examples of the goethite compound include goethite aluminum ((Fe, Al)O(OH)).

The other components of the alumina-containing ore are not particularly limited. However, the alumina component contains preferably trihydrate alumina (gibbsite) as a main component. The trihydrate alumina is contained preferably in an amount of 70 mass % or more with respect to the alumina content from the viewpoint of using effectively the effect of the present invention.

Specific examples of typical alumina-containing ores having the foregoing composition include bauxite produced in Southeast Asia, for example, Indonesia. More specifically, BINTAN ore and TAYAN ore are included. In the case of red mud that is derived from an alumina-containing ore produced in Indonesia, as compared with the other production districts, a high level of concentration is not easy to obtain at the time of settling. However, in accordance with the configuration of the present invention, especially a high level of concentration is obtainable.

In the Bayer process, for example, an alumina-containing ore that is a source material is mixed with an alkaline solution in a grinding machine such as a ball mill; after the ore is ground in a manner that the particle size thereof becomes 12 mesh pass through or lower, the ore is forwarded to an extraction apparatus where an alumina component is extracted. As the extraction apparatus, a sealable tubular reactor or vessel reactor is generally used. The extraction temperature and extraction time are not specified, because they depend on the ground size of bauxite, the kind of the alkaline solution, the concentration thereof, and others. However, conditions including apparatus conditions may be selected so as to extract alumina economically. Generally, the extraction temperature is from 110° C. to 160° C. and preferably from 115° C. to 150° C. Within the ranges of the extraction temperature, the red mud is produced while the iron component is kept in a form of goethite. The extraction time of alumina is within 5 hours and preferably from several minutes to 2 hours.

As the alkaline solution, an alkaline solution that is used in the Bayer process is usable. The alkaline solution used in the extraction of aluminum has an alkali concentration (in terms of NaOH) of 100 g/L to 400 g/L and preferably 120 g/L to 220 g/L. When an aluminate liquor is used as the alkaline solution, considering the concentration ratio of alumina ($Al_2O_3$) to soda (NaOH), the soda concentration, the alumina concentration, and the used amount thereof in the solution are selected so as to regulate the concentration ratio of alumina/soda (mass ratio) within 0.7 to 1.0.

In the Bayer process, after the alumina component is extracted, the resultant aluminate liquor that contains red mud is cooled to around 100° C. under normal pressure, and is immediately forwarded to a solid-liquid separation apparatus, so that the red mud contained in the aluminate liquor is separated from the liquid phase. The red mud slurry thus separated contains an alkali component and an aluminum component, so that washing is performed a plurality of times so as to recover these components.

Washing of Red Mud

In the washing method of red mud, the red mud and diluting fluid are mixed to obtain suspension, and then a flocculant is added to the suspension, and the red mud is settled and separated so as to wash the red mud. In the washing method of the present invention, the concentration of aluminum contained in the suspension is regulated to 95 g/L or less in terms of $Al_2O_3$. In this way, by lowering the concentration of aluminum in the suspension, even though the red mud contains goethite as an iron component in a large amount, the red mud is allowed to be provided with a settling promotion effect by a flocculant that contains a polymer having a repeating unit derived from (meth)acrylic acid or a salt thereof and being substantially free from a repeating unit derived from a vinylhydroxamic acid compound or a salt thereof.

The concentration of aluminum in the suspension is preferably 70 g/L or less, more preferably 50 g/L or less, and still more preferably 30 g/L or less, in terms of $Al_2O_3$. Within these ranges, the red mud is allowed to settle at a higher level of concentration to solid.

Note that, the alkali concentration in the suspension (in terms of NaOH) is not particularly limited, however, from the viewpoint of having a still higher level of settling promotion effect, preferably 200 g/L or less.

In addition, the temperature of the suspension is not particularly limited, but from the viewpoint of having a high level of concentration to solid by flocculating stably the red mud with a polymer of the present invention, preferably from 75° C. to 30° C. and more preferably from 55° C. to 40° C.

The diluting fluid used for the suspension is not particularly limited, but water may be used, for example. In the case of performing washing a plurality of times, clear liquid that has been used in a latter washing process may be also used.

The flocculant that is used in the present invention includes therein a polymer that has at least a repeating unit derived from (a) (meth)acrylic acid or a salt thereof (hereinafter, simply called as "monomer component (a)" in some cases) and is substantially free from a repeating unit derived from (b) a vinylhydroxamic acid compound or a salt thereof (hereinafter, simply called as "monomer component (b)" in some cases).

Additionally, as the monomer components of the polymer, at least one kind of monomer component may be contained, which is selected from a group consisting of (c) a (meth)acrylamide (hereinafter, simply called as "monomer component (c)" in some cases), (d) an N-vinylcarboxylic amide compound (hereinafter, simply called as "monomer component (d)" in some cases), (e) an acrylic acid derivative (hereinafter, simply called as "monomer component (e)" in some cases), and (f) a vinylalcohol derivative (hereinafter, simply called as "monomer component (f)" in some cases).

Examples of a (meth)acrylic acid or a salt thereof (a) include monomers that are represented by the following formula (1),

$$CH_2=C(R^1)COOM^1 \quad (1)$$

(in the formula, $R^1$ represents a hydrogen atom or a methyl group; and $M^1$ represents a hydrogen atom or an alkali metal atom). Specifically, acrylic acid, methacrylic acid, and an alkali metal salt (such as sodium salt and potassium salt) thereof are included. Acrylic acid or a sodium salt thereof is preferable.

The polymer used in the present invention is substantially free from a repeating unit derived from a vinylhydroxamic acid compound and a salt thereof (b). Here, "substantially free from" means that the content is 1 mole % or less with respect to the total content of the monomer components of the polymer.

Examples of the vinylhydroxamic acid compound and a salt thereof (b) include monomers that are represented by the following formula (2),

$$CH_2=C(R^2)CONHOM^2 \quad (2)$$

(in the formula, $R^2$ represents a hydrogen atom or a methyl group; and $M^2$ represents a hydrogen atom or an alkali metal atom). Specifically, vinylhydroxamic acid, isopropenyl hydroxamic acid, and an alkali metal salt (such as sodium salt and potassium salt) thereof are included.

Examples of (meth)acrylamide (c) include monomers that are represented by the following formula (3),

$$CH_2=C(R^3)CONH_2 \quad (3)$$

(in the formula, $R^3$ represents a hydrogen atom or a methyl group). Among these, acrylamide is preferable.

Examples of the N-vinylcarboxylic amide compound (d) include monomers that are represented by the following formula (4),

$$CH_2=CHNR^4COR^5 \quad (4)$$

(in the formula, each of $R^4$ and $R^5$ may be the same or different from each other and represents a hydrogen atom or a methyl group respectively). Specifically, N-vinylformamide, N-vinylacetoamide, N-methyl-N-vinylformamide, and N-methyl-N-vinylacetoamide are included. N-vinylacetoamide is preferable.

Examples of the acrylic acid derivative (e) and the vinylalcohol derivative (f) include monomers that are represented by the following formula (5),

$$CH_2=CR^6X \quad (5)$$

(in the formula, $R^6$ represents a hydrogen atom or a methyl group; X represents —CN, —$COOR^7$, —$CONH_2$, —$CONHR^8$, —$COR^9$, —$OCOR^{10}$, or —$OR^{11}$; note that, $R^7$ represents an alkyl group having 1 to 4 carbon atoms, wherein one hydrogen atom of the alkyl group may be substituted by —OH or —$NR^{12}R^{13}$; furthermore, $R^8$ represents an alkyl group having 1 to 4 carbon atoms, wherein one hydrogen atom of the alkyl group may be substituted by —OH or —$NR^{12}R^{13}$; and each of $R^9$, $R^{10}$, $R^{11}$, $R^{12}$, and $R^{13}$ represents an alkyl group having 1 to 4 carbon atoms respectively). Note that, the alkyl group having 1 to 4 carbon atoms represents a methyl group, an ethyl group, a propyl group, and a butyl group or an isomer thereof.

Specific examples of the compound represented by the formula (5) include: methyl acrylate; ethyl acrylate; propyl acrylate; 2-hydroxyethyl acrylate; N, N-dimethylaminoethyl acrylate; N, N-dimethylaminopropyl acrylamide; acrylonitrile; methylvinyl ketone; ethylvinyl ketone; propylvinyl ketone; vinylacetate; methylvinyl ether; ethylvinyl ether; propylvinyl ether; methyl methacrylate; ethyl methacrylate; propyl methacrylate; 2-hydroxyethyl methacrylate; 2-hydroxypropyl methacrylate; N, N-dimethylaminoethyl methacrylate; methacrylamide; N-isopropyl acrylamide; N, N-dimethylaminopropyl methacrylamide; N, N-dimethyl acrylamide; and N, N-diethyl acrylamide.

The ratio of the monomer component (a) with respect to the total monomer components in the polymer, which may be appropriately changed in accordance with the alkali concentration in the suspension, is preferably 4 mole % or more. When the amount of the monomer component (a) is small, flocculation effect to red mud (residue) is lowered, whereby sufficient settling rate is not easy to obtain. When the monomer component (c) is contained, 90 mole % or less is preferable in the polymer, preferably 1 mole % to 50 mole %, and still more preferably 1 mole % to 30 mole %. When the monomer component (d) or (e) is contained, 20 mole % or less is preferable in the polymer, 10 mole % or less is more preferable, and 5 mole % or less is still more preferable.

The weight average molecular weight of the polymer is preferably 200 to 20,000,000, more preferably 1,000 to 18,000,000, and still more preferably 2,000 to 15,000,000. Within these ranges, the polymer attains a high flocculation effect.

The weight average molecular weight of the polymer is evaluated by the gel permeation chromatography (GPC) with reference to polystyrene standard.

In the method of the present invention, examples of additional components of the flocculant may include slaked lime and starch. However, without using these components, only by adding the aforementioned polymer to red mud, the residue is allowed to be separated rapidly.

The polymer is contained in the flocculant in an amount of preferably 20 mass % or more and more preferably 25 mass % or more.

The addition amount of the flocculant to the suspension that contains the red mud is preferably 10 wtppm to 200 wtppm, more preferably 20 wtppm to 150 wtppm, and still more preferably 30 wtppm to 100 wtppm, in terms of pure polymer (the aforementioned polymer) with respect to the solid content weight of the red mud.

In the washing method of the present invention, when the concentration of alkali that is contained in the suspension is relatively high, as the polymer that is used for the flocculant, a polymer that has an anionization degree (the ratio of the monomer component (a) in the polymer) of 70 mole % to 100 mole % is preferably used. When the concentration of alkali that is contained in the suspension is low, as the polymer that is used for the flocculant, a polymer that has an anionization degree of 40 mole % to 70 mole % is preferably used. In this way, a flocculant that contains a polymer having a different anionization degree in accordance with the concentration of alkali contained in the suspension is used, whereby an excellently high level of concentration to solid is attainable.

When a flocculant that contains a polymer having an anionization degree of 70 mole % to 100 mole % is used, the concentration of alkali contained in the suspension is preferably 200 g/L or less and 30 g/L or more in terms of NaOH, and more preferably 200 g/L or less and 35 g/L or more. When the anionization degree is high as in the above ranges, even NaOH is contained in the suspension in a high concentration as in the above range, the settling promotion effect is easy to exert.

When a flocculant that contains a polymer having an anionization degree of 40 mole % to 70 mole %, the concentration of alkali contained in the suspension is preferably 35 g/L or less, more preferably 30 g/L or less and 5 g/L or more, and still more preferably 20 g/L or less and 7 g/L or more in terms of NaOH. In the above concentration ranges of alkali, when a polymer having the aforementioned anionization degree is used, a high level of concentration to solid is allowed to exert more markedly.

In the washing method of red mud, separation of clear liquid and red mud is performed preferably with a solid-liquid separation apparatus. As the solid-liquid separation apparatus, a thickener equipped with a mud collector is preferable.

Figure 3:
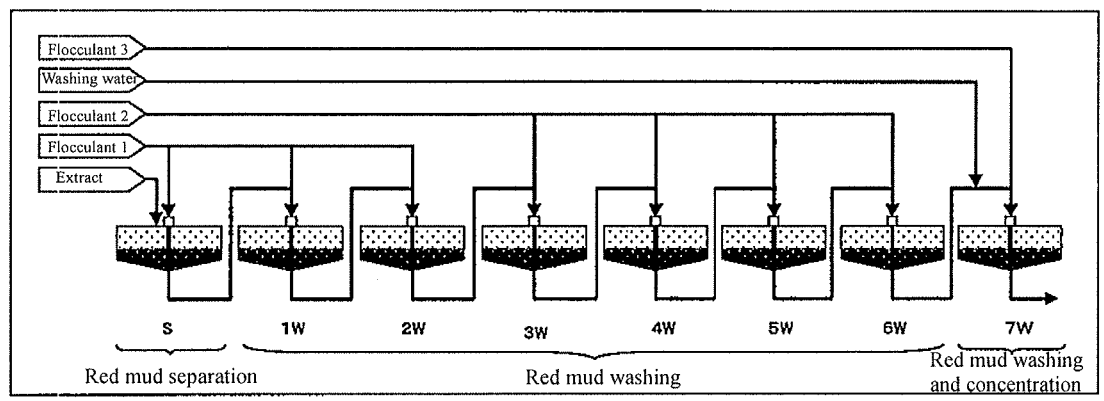
FIG. 3 shows a schematic diagram illustrating an apparatus used for a washing method according to the present invention (washing apparatus for red mud).

An example of the apparatus that is used in the washing method of the present invention is shown in FIG. 3. The washing apparatus for red mud shown in FIG. 3 has a plurality of thickeners that are equipped with a mud collector. The washing method of red mud using the above apparatus is configured by a red mud separation apparatus (S) that settles and separates red mud from an aluminate liquor (extraction liquid) that is produced by the Bayer process and contains red mud, and red mud washing apparatuses (1 W to 7 W) to which the red mud and a diluting fluid is added and mixed to obtain a suspension, after that, a flocculant is added so as to settle and separate the red mud. Note that, the unit number of the red mud washing apparatuses is not particularly limited, however, it is preferred that the apparatuses are installed in a unit number by which the red mud is provided with sufficient washing.

One embodiment of the washing method of red mud in accordance with the present invention includes the following method.

A washing method of red mud that is produced when an alumina-containing ore having a goethite to hematite mass ratio of 60/40 (goethite/hematite) or more in the iron component thereof is heat-treated with an alkaline solution at a temperature of 110° C. to 160° C. to obtain an aluminate liquor, includes;

repeating a process (hereinafter, simply called as "washing process") which includes mixing the red mud with a diluting fluid to obtain suspension; adding a flocculant to the suspension; and settling and separating the red mud, in a plurality of times.

In a process in which the concentration of aluminum in the suspension is 95 g/L or less in terms of $Al_2O_3$, a flocculant, which contains a polymer having a repeating unit derived from (meth)acrylic acid or a salt thereof and being substantially free from a repeating unit derived from a vinylhydroxamic acid compound or a salt thereof, is added to the suspension.

In a process in which the concentration of aluminum in the suspension is decreased to a low value of 95 g/L or less by recovering an aluminum component in the red mud slurry in the course of washing the red mud a plurality of times in the aforementioned washing process, it is preferred that a specific flocculant according to the present invention is used.

The aforementioned washing process is repeated in accordance with the present method, whereby red mud washed and concentrated is attainable, finally.

After the concentration of aluminum in the suspension is decreased to a lower value of 95 g/L or less, it is preferred that a polymer used for the flocculant is selected in accordance with the concentration of alkali in the suspension, Namely, among the washing processes that are performed in a plurality of times, in a washing process in which the concentration of aluminum in the suspension is 95 g/L or less and the concentration of alkali in the suspension is 200 g/L or less and 30 g/L or more in terms of NaOH (preferably 200 g/L or less and 35 g/L or more), a flocculant, which contains a polymer with an anionization degree of 70 mole % to 100 mole % having a repeating unit derived from (meth)acrylic acid or a salt thereof and being substantially free from a repeating unit derived from a vinylhydroxamic acid compound or a salt thereof, is preferably added to the suspension, considering that a settling promotion effect becomes easy to exert.

In addition, among the washing processes that are performed in a plurality of times, in a washing process in which the concentration of alkali in the suspension is 35 g/L or less in terms of NaOH, a flocculant, which contains a polymer with an anionization degree of 40 mole % to 70 mole % having a repeating unit derived from (meth)acrylic acid or a salt thereof and being substantially free from a repeating unit derived from a vinylhydroxamic acid compound or a salt thereof, is preferably added to the suspension, considering that a high level of concentration to solid is obtained.

Among the washing processes that are performed in a plurality of times, in a washing process (for example, an initial washing process) in which the concentration of aluminum in the suspension exceeds 95 g/L in terms of $Al_2O_3$, a flocculant, which contains a polymer having a repeating unit derived from a vinylhydroxamic acid compound or a salt thereof (b), is preferably added to the suspension. Here, as the vinylhydroxamic acid compound or a salt thereof (b), the compound that is exemplified above may be used. The monomer component (b) is preferably 5 mole % or more with respect to all of the monomer components contained in the polymer and more preferably 10 mole % to 30 mole %. The addition amount to the suspension that contains red mud is preferably 50 wtppm to 500 wtppm with respect to the solid content weight of the red mud, and more preferably 100 wtppm to 400 wtppm.

The level of concentration to solid of the red mud that is obtained by the washing method of the present invention is preferably 500 g/L or more, more preferably 600 g/L or more, and still more preferably 700 g/L or more. The upper limit thereof is not particularly limited, but it is about 900 g/L considering plugging of pipings. Within the above range of the level of concentration to solid, the discharged amount of red mud in the Bayer process is allowed to be reduced. Here, "level of concentration to solid" means [Dry weight of red mud (g)]/[Whole volume of red mud (L)] in the red mud finally obtained.

Furthermore, the red mud is usually disposed, but it is usable as a coloring material for outside walls of buildings or concrete, and a source of magnetic material.

In the separation of extraction residue of an alumina-containing ore that contains goethite, a mechanism by which the polymer works adequately as a flocculant is not exactly clear, but the following reason may be considered.

The polymer that is used in the present invention is considered to bring about anionic flocculation of the components of red mud through a cationic electrolyte of the polymer and to promote settling of the red mud. Therefore, the charge state on the surface of the red mud is important. In particular, when the iron component that is contained in the red mud is goethite, the isoelectric point of goethite is lower as compared with hematite, so that the charge state of the surface is considered to be easily affected by the other anionic components.

Considering the above, by decreasing the concentration of aluminum in the slurry, anions derived from aluminum may be reduced from the solution. As a result, substances that prevent the polymer from flocculating red mud are considered to be deceased.

In this way, by decreasing the concentration of aluminum in the slurry, a high level of settling promotion effect is considered to exert even in the case in which a flocculant that has been considered not to be usable so far is used.

In more details, there may be described as follows.

It is described that a polymer flocculant that contains sodium vinyloxamate forms a five-membered ring with Fe that is contained in bauxite reside (H. T. Chen, S. A. Ravishankar, R. S. Farinato, Rational polymer design for solid-liquid separations in mineral processing applications. International Journal of Mineral Processing 72(2003) 75-86.), and flocculates (FIG. 1). That is, even a conventional flocculant that has been used so far for bauxite that contains goethite is able to provide flocculates without being affected by charges.

Figure 2:
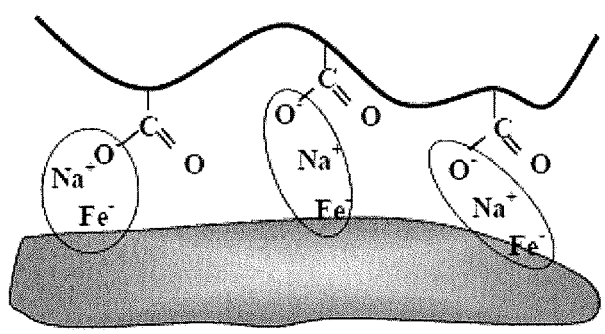
FIG. 2 shows a schematic diagram illustrating a flocculation morphology formed by a polymer flocculant that contains sodium polyacrylate (flocculation morphology of sodium polyacrylate).

On the other hand, a polymer flocculant that contains sodium polyacrylate, such as a polymer of the present invention, provides a flocculation morphology as shown in FIG. 2, that is, flocculates through electrolytes in the suspension, so that the flocculation effect is affected largely by charge balance in the suspension (P. D. Fawell, L. J. Kirwan, W. van Bronswijk, Adsorption of polyacrylates on hematite: In situ examination by ftir-atr at high and low pH. Proceedings of 6$^{th}$ International Alumina Quality Workshop 2002, 301-308). Namely, in the case of the polymer flocculant that contains sodium polyacrylate, an action of settling red mud is considered to work by anionic flocculation through cationic electrolytes.

When the form of Fe in the bauxite residue is hematite ($Fe_2O_3$), even the concentration of $Al_2O_3$ is high of exceeding 95 g/L, the flocculation effect is obtainable with a sodium polyacrylate polymer flocculant. On the other hand, when the form of the iron component is goethite (FeOOH), in a high concentration of $Al_2O_3$ exceeding 95 g/L, the flocculation effect is not obtained with the sodium polyacrylate polymer flocculant. The strength of surface potential of goethite and hematite in the suspension is considered to be involved. According to a document (for example, M. Grafe, G. Power, C. Klauber, Bauxite residue issues: III. Alkalinity and associated chemistry, Hydrometallurgy 108 (2011) 60-79.), goethite acquires an isoelectric point at low pH, so that goethite is stronger in surface potential polarity than hematite and is considered to be easily affected by the concentration of ions in the suspension.

The aluminum component that is dissolved in the suspension is in the form of aluminate ion ($Al(OH)^{4-}$) in the suspension, so that, considering the isoelectric point, the aluminum component is considered to be easy to affect the surface charge state of goethite. In the present invention, the concentration of aluminum in the suspension is selected to be low so as to decrease the concentration of aluminate ion in the suspension. Whereby, anions in the suspension that affect flocculation largely is allowed to be reduced. In this way, the effect of the present invention is considered to exert.

From the aforementioned reasons, as in the washing method of the present invention, even in the case of the red mud derived from an alumina-containing source material that contains an iron component having goethite as a principle ingredient, by selecting the concentration of aluminum in the suspension within a given range, a given polymer such as sodium polyacrylate is considered to be usable as a flocculant.

EXAMPLES

Hereinafter, the washing method of red mud according to the present invention is described with reference to Examples and Comparative Examples, but it should be construed that the invention is in no way limited to the following descriptions.

Aluminum-Containing Ore: Bauxite

The alumina-containing source ores (bauxite) that was used in the following examples include: a bauxite ore produced in Indonesia that contains goethite or a goethite compound as an iron component; and another bauxite ore produced in Australia that contains hematite in a large amount as an iron component. Analysis results for each bauxite ore obtained in accordance with the standard of JIS M8361-1968 are shown in Table 1. In addition, the crystalline morphologies of goethite and hematite that were contained in the source bauxite ores were evaluated by X-ray diffraction analysis under the following conditions. Identification and quantitative analysis using the standard addition technique were carried out. The content of goethite aluminum was calculated by matching to X-ray diffraction intensity peaks. In the results, it was confirmed that the mass ratio of goethite/hematite in the iron component of the bauxite ore produced in Indonesia was 60/40 and the mass ratio of goethite/hematite in the iron component of the bauxite ore produced in Australia was 13/87.

X-ray diffraction analyzer: SmartLab, manufactured by Rigaku Corp.

Measurement conditions: X-ray tube (CuKα)
  Tube voltage (45 kV)
  Tube current (200 mA)
  Scan speed in qualitative analysis (4°/min.)
  Scan speed in quantitative analysis (1°/min.)

TABLE 1

Analysis results of each bauxite

| | Origins of bauxite production | | Indonesia | Australia |
|---|---|---|---|---|
| Composition | Crystal water | Mass % | 23.4 | 26.5 |
| | $Al_2O_3$ | Mass % | 44.2 | 50.7 |
| | $Fe_2O_3$ | Mass % | 6.4 | 14.3 |
| | $TiO_2$ | Mass % | 0.67 | 3.02 |
| | $SiO_2$ | Mass % | 25.9 | 5.2 |
| Breakdown of $Al_2O_3$ | Gibbsite | Mass % | 39.6 | 41.2 |
| | Boehmite | Mass % | 0 | 5.14 |
| Iron component | G/H | Mass/Mass | 60/40 | 13/87 |
| | (G + GA)/H | Mass/Mass | 83/17 | 30/70 |

G/H: Goethite/Hematite
(G + GA)/H: (Goethite + Goethite Aluminum)/Hematite

Extraction Treatment

Each of the source bauxite ores was subjected to alumina extraction treatment respectively at an alumina component extraction temperature of 140° C. and an extraction time of 60 minutes in accordance with the following procedure. First, each bauxite was ground into 150 μm or less; the ground bauxite was added, dispersed, and mixed with 1 L of an aluminate liquor having a NaOH concentration of 155 g/L and an $Al_2O_3$ concentration of 70 g/L, in such an amount that a solution after extraction had an $Al_2O_3$/NaOH concentration mass ratio of 0.85; the resultant mixed liquid was transferred to a cylindrical pressure vessel (having a diameter of 60 mm and a height of 200 mm), which was then sealed. The sealed pressure vessel was put into an oil bath that had been preliminary heated at the extraction temperature. The sealed vessel was turned over for agitation during the required extraction time so as to extract alumina. After that, the pressure vessel was taken out of the oil bath quickly, rapidly cooled to 100° C., and then an aluminate liquor that contains red mud was taken out of the vessel. A part of the aluminate liquor was taken out, and the composition and solid concentration of the red mud were measured. The component analysis of the red mud was performed in accordance with the standard of J8361-1968. The solid concentration was calculated as: a given amount of the extracted liquid was filtered off and cleaned; and the weight of the resulting residue was measured. The results are shown in Table 2.

TABLE 2

Analysis results of red mud

| | Bauxite origins | | Indonesia | Australia |
|---|---|---|---|---|
| Composition | Crystal water | Mass % | 5.9 | 7.9 |
| | $Al_2O_3$ | Mass % | 20 | 29.9 |
| | $Fe_2O_3$ | Mass % | 12.5 | 5.2 |
| | $TiO_2$ | Mass % | 1.1 | 7 |

TABLE 2-continued

Analysis results of red mud

| | Bauxite origins | | Indonesia | Australia |
|---|---|---|---|---|
| | $SiO_2$ | Mass % | 51.6 | 10.9 |
| | $Na_2O$ | Mass % | 8.3 | 9.6 |
| Solid concentration of mixed liquid | | g/L | 40 | 35 |

Experiment Operations and Experiment Conditions

In order to carry out an experiment described later in which dissolved concentrations of NaOH and $Al_2O_3$ were changed in the mixed liquid that had been obtained in the extraction treatment, the following operation was performed. The red mud slurry obtained in the extraction treatment was spontaneously settled and concentrated under a condition of constant temperature, and then the resulting clear liquid was removed so as to prepare red mud. After given amounts of NaOH and an aluminum component were added to an aluminate liquor so as to adjust the concentration of solvent, the solution was added to the above prepared red mud so as to perform a settling test.

Evaluation of Settling Property

The mixed liquid obtained in the above treatment was transferred to a 250 mL heat-resistant glass settling tube (having an inside diameter of 30 mm and a height of 250 mm) and kept in a constant temperature bath controlled at a constant temperature of 40° C. to 98° C. A required flocculant was added to the settling tube having the mixed liquid in accordance with the conditions of Examples and Comparative Examples. After the mixed liquid was agitated uniformly under the same conditions, the height of the settled interface was measured. The height of the interface that included solid content was evaluated in percent at every hour elapsed, wherein the height of the mixed liquid interface in the settling tube at the time of starting settling was evaluated as 100%.

Example 1 and Comparative Examples 1 to 3

The effect of the concentration of $Al_2O_3$ in the suspension affecting flocculation of red mud was confirmed by using bauxite produced in Indonesia. In Comparative Examples 1 and 3, an emulsion type polymer flocculant ("HX-200" (trade name) manufactured by CYTEC Corp.) was added in an amount of 150 wtppm with respect to the solid mass content of red mud. The polymer flocculant had a repeating unit derived from sodium acrylate, acrylamide, and vinylhydroxamic acid, a composition ratio (mole %) of 71:16:13, a solid content concentration of 29 mass %, and an average molecular weight of 1,300,000 or more. In Example 1 and Comparative Example 2, as a polymer flocculant, a sodium acrylate powder ("Pararock 100A102" (trade name) manufactured by Asada Chemical Industry Co., Ltd.) having a weight average molecular weight of 12,000,000 was added in an amount of 80 wtppm with respect to the solid mass content of red mud. Whereby, settling properties were compared. The results are shown in Table 3.

TABLE 3

Comparison in effects to flocculation affected by Al₂O₃ concentration

| | | Comparative Example 1 | Comparative Example 2 | Comparative Example 3 | Example 1 |
|---|---|---|---|---|---|
| Bauxite ores | | | Indonesia ore | | |
| NaOH concentration | g/L | 160 | 160 | 160 | 160 |
| Al₂O₃ concentration | g/L | 100 | 100 | 40 | 40 |
| Temperature | °C. | 75 | 75 | 75 | 75 |
| Polymer flocculant names | | HX-200 | 100A102 | HX-200 | 100A102 |
| Addition amount of flocculant | wt ppm | 150 | 80 | 150 | 80 |
| Settling time | | | Interface height [%] | | |
| 0 | min | 100 | 100 | 100 | 100 |
| 1 | min | 40 | No effect | 24 | 26 |
| 1.5 | min | 30 | | 21 | 22 |
| 2 | min | 27 | | 19 | 20 |
| 3 | min | 25 | | 16 | 16 |
| 5 | min | 22 | | 15 | 14 |
| 10 | min | 20 | | 12 | 11 |

Table 3 shows that an adequate flocculation performance is exhibited and that effectiveness is obtained regardless the conditions of NaOH and Al₂O₃ in the case of adding "HX-200" in Comparative Examples 1 and 3. Comparison between Comparative Example 2 and Example 1 shows that sodium polyacrylate is usable as a polymer flocculant when the concentration of Al₂O₃ decreases and that flocculation effect is obtained. Whereby, the flocculation effect of sodium polyacrylate is considered to be ruled largely by the concentration of Al₂O₃, but not by the concentration of NaOH.

In addition, the red mud flocculate that was flocculated with sodium polyacrylate exhibited a more adequate stickiness (highly viscous) of mud than the red mud that was flocculated with "HX-200", so excellent concentration performance would be expected.

Examples 2 to 5

The effect of the concentration of Al₂O₃ affecting flocculation of red mud was confirmed. As a polymer flocculant, sodium polyacrylate ("Pararock 100A102" (trade name) manufactured by Asada Chemical Industry Co., Ltd.) having an average molecular weight of 12,000,000 was added to the suspension in an amount of 180 wtppm with respect to the solid mass content of red mud. Whereby, settling properties were compared. The results are shown in Table 4.

TABLE 4

Comparison in effects to flocculation affected by Al₂O₃ concentration

| | | Example 2 | Example 3 | Example 4 | Example 5 |
|---|---|---|---|---|---|
| Bauxite ores | | | Indonesia ore | | |
| NaOH concentration | g/L | 150 | 150 | 150 | 150 |
| Al₂O₃ concentration | g/L | 95 | 80 | 65 | 50 |
| Temperature | °C. | 55 | 55 | 55 | 55 |
| Polymer flocculant names | | | 100A102 | | |
| Addition amount of flocculant | wt ppm | 180 | 180 | 180 | 180 |
| Settling time | | | Interface height [%] | | |
| 0 | min | 100 | 100 | 100 | 100 |
| 1 | min | 9 | 9 | 9.5 | 9.5 |
| 1.5 | min | 8.7 | 8 | 9 | 9 |
| 2 | min | 8.5 | 7 | 8.8 | 8.8 |
| 3 | min | 8 | 6.5 | 8.5 | 8 |
| 5 | min | 7.5 | 7.5 | 8 | 8 |
| 10 | min | 7 | 7 | 6.5 | 6.2 |

Table 4 shows that the flocculation effect of "100A102" was enhanced as the concentration of Al₂O₃ decreases. Whereby, settling and concentrating properties were enhanced. The results of Comparative Example 2 shown in Table 3 show that the flocculation effect disappeared at an Al₂O₃ concentration of 100 g/L or more. Whereby, the range of use is about 95 g/L or less of the Al₂O₃ concentration.

Examples 6 and 7

The effect of suspension temperature affecting flocculation of red mud was confirmed. The polymer flocculant was added in a manner substantially similarly to Examples 2 to 5. The results are shown in Table 5.

TABLE 5

Comparison in effects to flocculation affected by temperature

| Example numbers | | Example 6 | Example 7 |
|---|---|---|---|
| Bauxite ores | | Indonesia ore | |
| NaOH concentration | g/L | 150 | 150 |
| Al₂O₃ concentration | g/L | 65 | 65 |
| Temperature | °C. | 55 | 40 |
| Polymer flocculant names | | 100A102 | |
| Addition amount of flocculant | wt ppm | 180 | 180 |
| Settling time | | Interface height [%] | |
| 0 | min | 100 | 100 |
| 1 | min | 9.5 | 10.5 |
| 1.5 | min | 9 | 9.2 |
| 2 | min | 8.8 | 9 |
| 3 | min | 8.5 | 8.8 |
| 5 | min | 8 | 8 |
| 10 | min | 6.5 | 6.5 |

From the results shown in Table 5, at high temperature, heat convection was generated and flowing caused by Brownian motion becomes strong, whereby flocculation properties were considered to be affected. In order to flocculate stably the reside that contains goethite or a goethite compound by using sodium polyacrylate as a polymer flocculant, a temperature of 75° C. to 30° C. is desirable. This is because the aluminum component in the solvent is precipitated at a temperature of 30° C. or lower.

Sodium polyacrylate was usually used as a polymer flocculant for the treatment of bauxite residue that contains goethite as an iron component, but an adequate settling property was not obtained. To the contrary, the aforementioned Examples and Comparative Examples show that even sodium polyacrylate provides an adequate settling property under a condition in which the concentration of $Al_2O_3$ is low in an objective treatment liquid, whereby the level of concentration to solid increases. These are considered to be caused by the difference in flocculation morphologies of polymer flocculants.

Comparative Examples 4 to 8

Under operation conditions assuming an actual apparatus shown in FIG. 3, an experiment of confirming flocculation effect and concentration property of red mud was performed. Extraction treatment was performed under substantially similar conditions to the above. The experiment conditions after the extraction treatment were selected by adjusting the concentration of NaOH in the washing apparatus at a target value through dilution with water. In Comparative Examples 4 to 8, "HX-200" was added as a polymer flocculant.

Examples 8 to 12

In Examples 8 to 12, as a polymer flocculant, "Pararock 100A102" (having an anionization degree of 100 mole % and a molecular of 12,000,000) was added.

Examples 13 to 15

In Examples 13 to 15, as a polymer flocculant, "A-240" (trade name), a copolymer of sodium acrylate and acrylamide, manufactured by Hakuto Co., Ltd. (having an anionization degree of 60 mole % and an acrylic acid to acrylamide mole % ratio of 60:40, and a molecular weight of 8,000,000) was added. The results of Comparative Examples 4 to 8 and Examples 8 to 15 are shown in Table 6.

TABLE 6

Comparison in levels of concentration to solid

| | | Example numbers | | | | | | |
|---|---|---|---|---|---|---|---|---|
| | | Comparative Example 4 | Comparative Example 5 | Comparative Example 6 | Comparative Example 7 | Comparative Example 8 | Example 8 | Example 9 |
| Bauxite ores | | | | Indonesia ore | | | | |
| NaOH concentration | g/L | 97 | 76 | 55 | 33 | 25 | 76 | 55 |
| $Al_2O_3$ concentration | g/L | 56 | 44 | 32 | 20 | 15 | 44 | 32 |
| Temperature | ° C. | 60 | 50 | 45 | 45 | 40 | 50 | 45 |
| Polymer flocculant names | | | | HX-200 | | | 100A102 | |
| Addition amount of flocculant | wt ppm | 150 | 150 | 150 | 150 | 150 | 80 | 80 |

| Settling time | | Interface height [%] | | | | | | |
|---|---|---|---|---|---|---|---|---|
| 0 | min | 100 | 100 | 100 | 100 | 100 | 100 | 100 |
| 1 | min | 17.5 | 14.3 | 13 | 14 | 14.8 | 17 | 15 |
| 1.5 | min | 15.8 | 13 | 12 | 12.5 | 13 | 17 | 13.8 |
| 2 | min | 14.5 | 12 | 11 | 12 | 12.3 | 16.5 | 12.5 |
| 3 | min | 13.3 | 11 | 10 | 11 | 11.5 | 14.8 | 11 |
| 5 | min | 11 | 10.2 | 9.4 | 10 | 11 | 12 | 9.5 |
| 10 | min | 10.5 | 9 | 8.5 | 9.8 | 10.3 | 9.5 | 8 |
| Levels of concentration to solid | g/L | 358 | 374 | 392 | 335 | 335 | 396 | 432 |

| | | Example numbers | | | | | |
|---|---|---|---|---|---|---|---|
| | | Example 10 | Example 11 | Example 12 | Example 13 | Example 14 | Example 15 |
| Bauxite ores | | | | Indonesia ore | | | |
| NaOH concentration | g/L | 33 | 25 | 15 | 33 | 25 | 15 |
| $Al_2O_3$ concentration | g/L | 20 | 15 | 7 | 20 | 15 | 7 |
| Temperature | ° C. | 45 | 40 | 40 | 45 | 40 | 40 |
| Polymer flocculant names | | | 100A102 | | | A-240 | |
| Addition amount of flocculant | wt ppm | 80 | 80 | 80 | 150 | 150 | 150 |

| Settling time | | Interface height [%] | | | | | |
|---|---|---|---|---|---|---|---|
| 0 | min | 100 | 100 | 100 | 100 | 100 | 100 |
| 1 | min | 11 | 12 | 13 | — | 16.3 | 14.3 |
| 1.5 | min | 10.5 | 11.5 | 12.25 | 17 | 14.5 | 13 |
| 2 | min | 10 | 11 | 12 | 14.5 | 13 | 12 |
| 3 | min | 9.8 | 10.8 | 11.5 | 12.3 | 11.8 | 10.8 |
| 5 | min | 9 | 10.5 | 11 | 10.3 | 10 | 9.3 |
| 10 | min | 9 | 10 | 11 | 8 | 8 | 8 |
| Levels of concentration to solid | g/L | 364 | 339 | 291 | 455 | 451 | 432 |

Table 6 shows that a flocculation effect of the polymer flocculants, sodium polyacrylate and a copolymer of sodium acrylate and acrylamide, was attained. In a high alkali concentration range (Comparative Examples 4 to 7 and Examples 8 to 10), "100A102" was shown to be superior, and in a low alkali concentration range (Comparative Example 8 and Examples 14 and 15), "A-240" was shown to be superior to "HX-200".

Verification Examples with Actual Apparatus

Base on the laboratory test data shown in Examples and Comparative Examples, a washing apparatus was constructed (FIG. 3), by which red mud that contains goethite or goethite compounds as an iron component is treated efficiently. After an adequate polymer flocculant was added to each separation bath while the concentration of alkali was used as an indicator, separation, washing (alkali recovery), and concentration were performed. Note that, "Systems" in Table 7 corresponds to the number of washing times, for example, "3 W" means a third time washing.

Comparative Example 9 to 13

In Comparison Examples 9 to 13, "HX-200" was added as a polymer flocculant.

Examples 16 to 19

In Examples 16 to 19, as a polymer flocculant (flocculant 2), "Pararock 100A102" (having an anionization degree of 100 mole %) was added. Note that, in 1 W and 2 W that were preceding processes of Examples 16 to 19, "HX-200" was added as a polymer flocculant (flocculant 1), and then washing was performed.

Example 20

In Example 20, as a polymer flocculant (flocculant 3), "A-240" (having an anionization degree of 60 mole % and an acrylic acid to acrylamide mole % ratio of 60:40) was added.

Test results (Comparative Examples 9 to 13 and Examples 16 to 20) with the actual apparatus are shown in Table 7.

Table 7 shows that sodium polyacrylate ("100A102") and a copolymer ("A-240") of sodium acrylate and acrylamide provided a higher concentration effect than "HX-200" in each system. In addition, the addition amount may be reduced by adding a polymer flocculant of "Pararock 100A102" in the systems 3 W to 6 W.

Stability of Red Mud Surface

Figure 4:
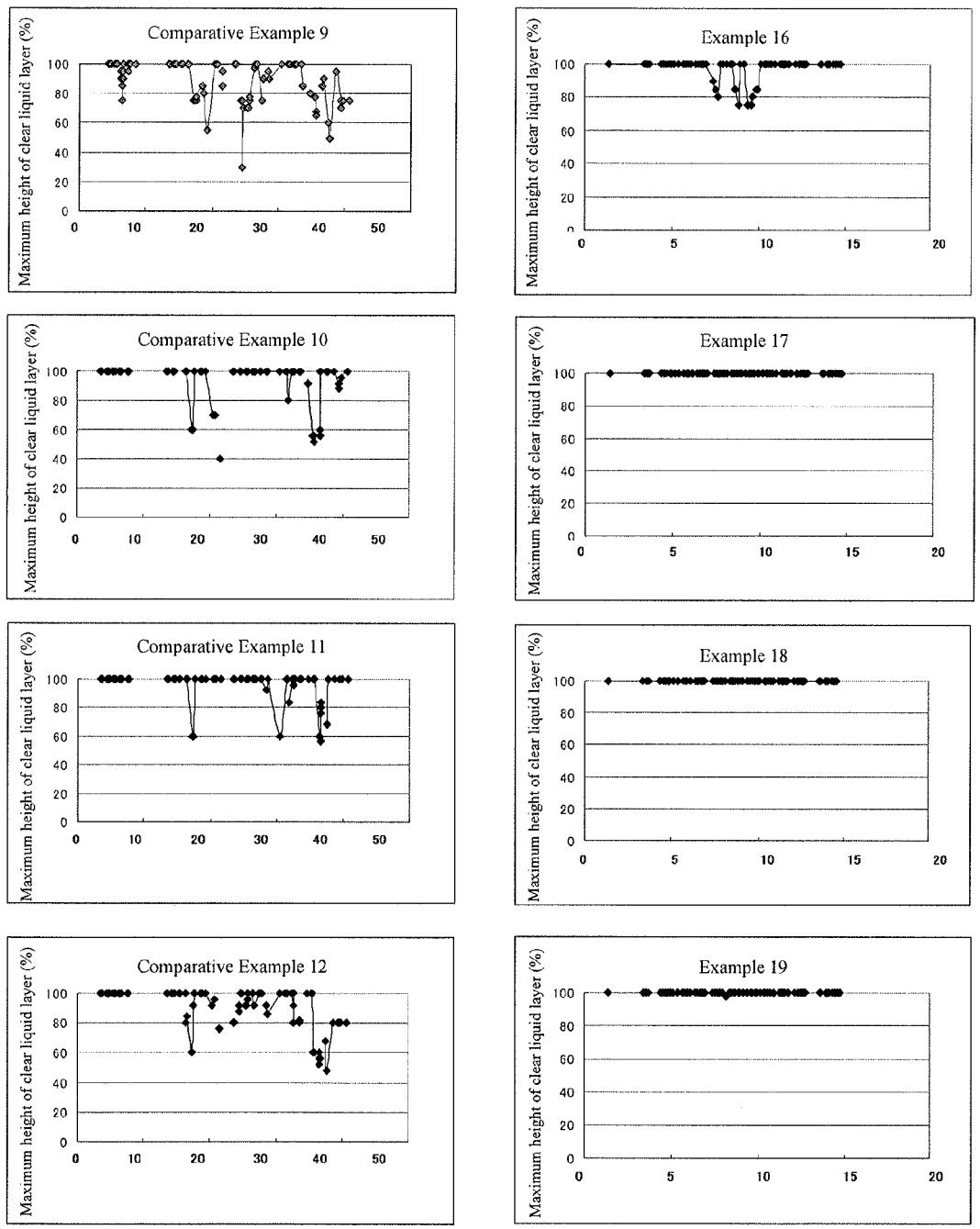
FIG. 4 shows graphs illustrating the results of evaluating stability of the red mud surface in Examples and Comparative Examples.

In the systems of Comparative Examples 9 to 12 and Examples of 16 to 19, in the course of continuous operation with the actual apparatus carried out over several days, the change in the height of a clear liquid layer was observed so as to evaluate the stability of red mud surface. Note that, in the present evaluation, the maximum height of the clear liquid layer was selected to be 100%. The results are shown in FIG. 4.

The results show that sodium polyacrylate ("100A102") provides a higher stability of red mud surface than "HX-200".

Spillover Effect

In the case of using "HX-200" as a polymer flocculant as in the systems of Comparative Examples 9 to 13, concentration properties were not adequate and a trouble of rising of the red mud surface (decrease of clear liquid zone) in each separation bath was encountered many times. However, by an addition of sodium polyacrylate and/or a copolymer of sodium acrylate and acrylamide, stickiness of the mud was improved and the trouble of rising of the red mud surface was eliminated. This may lead to the following reductions: increase in the waste amount caused by increasing extraction amount in the course of red mud surface recovery operation is reduced (stable operation); the alkali loss in red mud solid adhesion is reduced; furthermore, the using amount of sulfuric acid in neutralization treatment is reduced. Whereby, more efficient operation is allowed to be performed.

INDUSTRIAL APPLICABILITY

The separation method of the present invention is applicable to settling separation of red mud that is produced in the Bayer process in which alumina component is separated from bauxite, and to washing of the red mud after the settling

TABLE 7

Test results with actual apparatus

| | | Example numbers | | | | | | | | | |
| --- | --- | --- | --- | --- | --- | --- | --- | --- | --- | --- | --- |
| | | Comparative Example 9 | Comparative Example 10 | Comparative Example 11 | Comparative Example 12 | Comparative Example 13 | Example 16 | Example 17 | Example 18 | Example 19 | Example 20 |
| Systems | | 3W | 4W | 5W | 6W | 7W | 3W | 4W | 5W | 6W | 7W |
| Bauxite ores | | | | | | Indonesia ore | | | | | |
| NaOH concentration | g/L | 67 | 46 | 30 | 19.6 | 15 | 53 | 39 | 24 | 17 | 17 |
| Al$_2$O$_3$ concentration | g/L | 33 | 22 | 15 | 8 | 8 | 25 | 18 | 11 | 7 | 9 |
| Temperature | ° C. | 50 | 45 | 45 | 40 | 40 | 50 | 45 | 45 | 40 | 40 |
| Polymer flocculant names | | | | HX-200 | | | | | 100A102 | | A-240 |
| Addition amount of flocculant | wt ppm | 95 | 80 | 70 | 76 | 193 | 74 | 33 | 35 | 49 | 179 |
| Levels of concentration to solid | g/L | 569 | 600 | 595 | 404 | 634 | 758 | 735 | 779 | 665 | 700 |

The invention claimed is:

1. A washing method of red mud that is produced when an alumina-containing ore having a goethite to hematite mass ratio of 60/40 (goethite/hematite) or more in the iron component thereof is heat-treated with an alkaline solution at a temperature of 110° C. to 160° C. to obtain an aluminate liquor, comprising:
   repeating a process, the process comprising mixing the red mud with a diluting fluid to obtain a suspension, adding a flocculant to the suspension, and settling and separating the red mud;
   wherein, in at least one of the process repetitions, a concentration of aluminum in the suspension is more than 95 g/L in terms of $Al_2O_3$, and the flocculant comprises a polymer having a repeating unit derived from a vinylhydroxamic acid compound or a salt thereof, and
   wherein, in at least one of the process repetitions, a concentration of aluminum in the suspension is 95 g/L or less in terms of $Al_2O_3$, and the flocculant comprises a polymer having a repeating unit derived from (meth)acrylic acid or a salt thereof and being substantially free from a repeating unit derived from a vinylhydroxamic acid compound or a salt thereof.

2. The washing method of red mud according to claim 1, wherein, in at least one of the process repetitions, a concentration of aluminum in the suspension is 95 g/L or less in terms of $Al_2O_3$ and a concentration of alkali in the suspension ranges from 30 g/L to 200 g/L in terms of NaOH, and the flocculant comprises a polymer having an anionization degree of 70 mole % to 100 mole % and having a repeating unit derived from (meth)acrylic acid or a salt thereof and being substantially free from a repeating unit derived from vinylhydroxamic acid compound or a salt thereof.

3. The washing method of red mud according to claim 1, wherein, in at least one of the process repetitions, a concentration of aluminum in the suspension is 95 g/L or less in terms of $Al_2O_3$ and a concentration of alkali in the suspension is 35 g/L or less in terms of NaOH, and the flocculant comprises a polymer having an anionization degree of 70 mole % to 100 mole % and having a repeating unit derived from (meth)acrylic acid or a salt thereof and being substantially free from a repeating unit derived from vinylhydroxamic acid compound or a salt thereof.

4. A method of producing red mud by a washing method according to claim 1, wherein, the red mud has a level of concentration to solid of 600 g/L or more.

* * * * *